US010419453B2

(12) United States Patent
Lim (10) Patent No.: US 10,419,453 B2
(45) Date of Patent: Sep. 17, 2019

(54) SYSTEM AND METHOD FOR 3D ABSTRACT OBJECT MODELLING OF HIGH ENTROPIC INFORMATION SECURITY THREATS

(71) Applicant: Certis CISCO Security Pte Ltd, Singapore (SG)

(72) Inventor: Keng Leng Albert Lim, Singapore (SG)

(73) Assignee: CERTIS CISCO SECURITY PTE LTD, Singapore (SG)

( * ) Notice: Subject to any disclaimer, the term of this patent is extended or adjusted under 35 U.S.C. 154(b) by 0 days.

(21) Appl. No.: 15/038,696

(22) PCT Filed: Dec. 14, 2015

(86) PCT No.: PCT/SG2015/050492
§ 371 (c)(1),
(2) Date: May 23, 2016

(87) PCT Pub. No.: WO2017/105340
PCT Pub. Date: Jun. 22, 2017

(65) Prior Publication Data
US 2018/0041523 A1     Feb. 8, 2018

(51) Int. Cl.
*H04L 29/06*     (2006.01)
*G06F 21/50*     (2013.01)
*H04L 12/24*     (2006.01)

(52) U.S. Cl.
CPC .......... *H04L 63/1416* (2013.01); *G06F 21/50* (2013.01); *H04L 41/22* (2013.01); *H04L 63/1408* (2013.01); *H04L 63/20* (2013.01)

(58) Field of Classification Search
CPC ...................................................... H04L 41/22
See application file for complete search history.

(56) References Cited

U.S. PATENT DOCUMENTS 6,906,709 B1     6/2005   Larkin et al.
8,766,997 B1 *   7/2014   Hickman ................. G09G 5/00
                                                    345/420

(Continued)

FOREIGN PATENT DOCUMENTS

WO     20100049716 A1     5/2010

OTHER PUBLICATIONS

International Search Report for International Application No. PCT/SG2015/050492, Search completed Feb. 25, 2016, dated Feb. 25, 2016, 4 Pgs.

(Continued)

*Primary Examiner* — Grace Q Li
(74) *Attorney, Agent, or Firm* — William P. Wilbar, IV (57) ABSTRACT

This invention relates to a system and method for simultaneously displaying real-time information security threat posture of a plurality of computers and its intermediary networks that are under surveillance. In particular, the invention involves displaying a three-dimensional abstract object that has been scaled according to the size and orientation of a display screen so that the entirety of the three-dimensional abstract object may be simultaneously viewed by viewers of the display technology in its entirety. The displayed three-dimensional abstract object is made up of an amalgamation of semi-translucent three-dimensional shapes that are arranged together to achieve the unified shape and form of the three-dimensional abstract object. Each semi-translucent three-dimensional shape in the three-dimensional abstract object can represent a sector of business industry and/or its entire computer network that is under surveillance for information security threats and/or has a high probability of being cyber-attacked by malicious sources.

22 Claims, 6 Drawing Sheets

(56) References Cited

U.S. PATENT DOCUMENTS

| | | | | |
|---|---|---|---|---|
| 2005/0060665 | A1* | 3/2005 | Rekimoto | G06F 9/4443 715/810 |
| 2011/0265092 | A1* | 10/2011 | Ohtani | G06F 9/5094 718/104 |
| 2012/0131488 | A1* | 5/2012 | Karlsson | G06F 3/04883 715/771 |
| 2012/0254977 | A1* | 10/2012 | Jiang | H04L 63/1458 726/12 |
| 2013/0002668 | A1* | 1/2013 | Poston | G06T 19/003 345/420 |
| 2013/0162502 | A1* | 6/2013 | Lee | G09G 5/003 345/1.2 |
| 2013/0249906 | A1* | 9/2013 | Gunderson | G06T 15/20 345/420 |
| 2015/0009038 | A1 | 1/2015 | Trossbach, Jr. et al. | |
| 2015/0156170 | A1* | 6/2015 | Gurbani | G06F 21/554 726/12 |
| 2015/0268831 | A1* | 9/2015 | Sripada | G06F 3/0488 715/849 |

OTHER PUBLICATIONS

Conti, G. et al., "Attacking Information Visualization System Usability Overloading and Deceiving the Human", SOUPS '05 Proceedings of the 2005 symposium on Usable privacy and security, Jun. 7, 2015.

Lau, S., "The Spinning Cube of Potential Doom", Communications of the ACM Jun. 2004, vol. 47, No. 6.

Le Malécot, E. et al., "Interactively Combining 2D and 3D Visualization for Network Traffic Monitoring", VizSEC '06 Proceedings of the 3rd international workshop on Visualization for computer security Nov. 3, 2006.

Le Malécot, E. et al., "Toward a Scalable Visualization System for Network Traffic Monitoring", IEICE Transactions on Information and Systems, vol.E91-D No. 5 pp. 1300-1310, Feb. 12, 2008.

Oberheide, J. et al., "Flamingo: Visualizing Internet Traffic", Network Operations and Management Symposium, 2006, NOMS 2006. 10th IEEE/IFIP.

Teoh et al., "Case Study: Interactive Visualization for Internet Security", Visualization, VIS 2002. IEEE, Nov. 2002.

Extended European Search Report from EPO dated Jun. 16, 2017 for relating European Application No. 15862138.3.

Armitage et al., "Intuitive Real-Time Network Monitoring Using Visually Orthogonal 3D Metaphors", Australian Telecommunications Networks & Applications Conference, Dec. 8-10, 2004.

* cited by examiner

SYSTEM AND METHOD FOR 3D ABSTRACT OBJECT MODELLING OF HIGH ENTROPIC INFORMATION SECURITY THREATS

FIELD OF THE INVENTION

This invention relates to a system and method for simultaneously displaying real-time information security threat posture of a plurality of computers and its intermediary networks that are under surveillance. In particular, the invention involves displaying a three-dimensional abstract object that has been scaled according to the size and orientation of a visualization panel such as a display screen so that the entirety of the three-dimensional abstract object may be simultaneously viewed by viewers of the display technology in its entirety. The displayed three-dimensional abstract object is made up of an amalgamation of semi-translucent three-dimensional shapes that are arranged together to achieve the unified shape and form of the three-dimensional abstract object. Each semi-translucent three-dimensional shape in the three-dimensional abstract object can represent a sector of business industry and/or its entire computer network that is under surveillance for information security threats and/or has a high probability of being cyber-attacked by malicious sources. As the information security status of the computer network associated with the semi-translucent three-dimensional shape changes, a design associated with the affected three-dimensional shape changes as well.

SUMMARY OF PRIOR ART

Computer security professionals are typically in charge of a very large number of computer networks. These professionals need to be continuously vigilant and aware of information security threat landscapes and/or the security postures of all the computer networks under their surveillance in real-time. This is so that these computer security professionals are able to have a holistic view of worldwide information security threats as they unfold. By doing so, these professionals will have total situational awareness as to how these threats may affect the computers and intermediary networks under their surveillance.

Conventionally, the statuses of the computer networks under surveillance are displayed using a text based approach as rows or columns in a table. Each row in the table will set out the name of the computer network that is under surveillance while the corresponding columns will set out the current status of the computer network under surveillance. This table may be moved around a display screen and may be sized to the user's preferences. As the table's contents are usually too large to be seen all at once, i.e. due to the large number of computer networks under surveillance, the user will have to scroll through the table in order to view all the contents of the table. This visualization method is extremely unproductive and unnecessarily consumes time and resources that may be better utilized.

Even if visualization methods that employ two-dimensional (2D) or three-dimensional (3D) graphical network schematics and/or maps were to be utilized, these visualization methods would find it challenging to simultaneously display the statuses of all computer and networks under surveillance. When this primitive display method is employed, displayed items are represented as extremely tiny objects on the finite visualization real estate of these 2D and/or 3D maps and typically require a user to manually zoom-in and zoom-out in order to obtain a clearer visualization of the minute displayed items. This requirement for the user to manually zoom in and out results in a significant delay in the actionable response time to manage an information security threat.

The increase in the frequency of cyber-attacks necessitates the requirement for having rapid response capabilities to address these information security threats. Before the responsible security professional can anticipate and execute remedial or preventive threat mitigation strategies, the personnel monitoring these computer networks security postures have to be made instantaneously aware of the change in the threat levels or security well-being of the computer assets and the intermediary networks under their surveillance. Only when the responsible personnel are made aware of the anticipated threat, then only may the information security threat be addressed. If the existing method of displaying graphical content in a table format or two-dimensional (2D) or three-dimensional (3D) graphical network schematics and/or maps are too large or too small to be visualized all at once, formidable information security threats affecting the computer network under surveillance may be totally missed and not addressed. Such threats may be inadvertently omitted as scrolling and manually zooming in/out through the table and maps to look for information security threats affecting computer networks under surveillance is an inefficient, slow and tedious way of performing total information surveillance of the computer assets and their intermediary networks.

For the above reasons, those skilled in the art are constantly striving to come up with a system and method that is capable of simultaneously displaying in real-time, the updated information security situation for a sector of business industry under surveillance and/or its entire computer network. The updated information security situation will allow a user/viewer to be immediately made aware of information security threats and/or malicious sources that have a high probability cyber-attacking the sector of business industry under surveillance and/or its entire computer network.

SUMMARY OF THE INVENTION

The above and other problems are solved and an advance in the art is made by systems and methods provided by embodiments in accordance with the invention. A first advantage of embodiments of systems and methods in accordance with the invention is that real-time information security statuses of a sector of business industry under surveillance and/or its entire computer network that is under surveillance may be simultaneously displayed on a conventionally sized display screen.

A second advantage of embodiments of systems and methods in accordance with the invention is that three-dimensional shapes that represent computer security statuses of important computer networks may be positioned at more conspicuous positions on the display screen as compared to the positions of other three-dimensional shapes that are associated with other types of computer networks. Such an arrangement ensures that the viewer will always be made aware of the present statuses of these computer networks even though the viewer may be attending to cyber-threats that are affecting other types of computer networks.

A third advantage of embodiments of systems and methods in accordance with the invention is that the computer networks under surveillance may be clustered and arranged according to the type of cyber-attack or threat that is presently affecting the computer networks. This allows for a faster response to be formulated to address the nature, type or origin of the cyber-security attack.

A fourth advantage of embodiments of systems and methods in accordance with the invention is that when a status of a computer network under surveillance changes due to the occurrence of a cyber-attack or threat on the computer network under surveillance, this attack or threat may be immediately disrupted. The attack is disrupted when an intermediate upstream gateway of the computer network is instructed by the monitoring system to add the Internet Protocol address of the source that generated the attack to the Access Control List of the gateway for a predetermined period of time.

The above advantages are provided by embodiments of a system in accordance with the invention operating in the following manner.

According to a first aspect of the invention, the system for simultaneously displaying real-time information security statuses of computer networks that are under surveillance to obtain situational awareness of the computer networks comprises a computing device configured to generate a semi-translucent three-dimensional shape having a first design for each of the computer networks under surveillance, wherein each generated semi-translucent three-dimensional shape is associated with a computer network under surveillance, and to arrange all the semi-translucent three-dimensional shapes into a three-dimensional object. The system also includes a display control unit operable with the computing device, the display control unit configured to, receive parameters of a display screen size and orientation, size the three-dimensional object according to the received parameters to simultaneously display an entirety of the three-dimensional object, and to change the design of semi-translucent three-dimensional shapes in the three-dimensional object to a second design in response to the computing device receiving event notifications from computer networks associated with the semi-translucent three-dimensional shapes.

With reference to the first aspect, in a first possible implementation of the first aspect, the system further comprises a control logic unit operable in the computing device, the control logic unit configured to assign a weightage to each semi-translucent three-dimensional shape in the three-dimensional object, wherein positioning of the semi-translucent three-dimensional shapes in the three-dimensional object are determined by the weightages assigned to each semi-translucent three-dimensional shape.

With reference to the first aspect, in a second possible implementation of the first aspect, the system further comprises an input device operable with the computing device, the input device configured to receive input from a user of the system to permit the user to cause the display control unit to rotate the three-dimensional object about a plurality of axes.

With reference to the first aspect, in a third possible implementation of the first aspect, the system further comprises an input device operable with the computing device, the input device configured to receive input from a user of the system to permit the user to cause the display control unit to alter geometry of the three-dimensional object.

With reference to the first aspect, in a fourth possible implementation of the first aspect, the system further comprises an input device operable with the computing device, the input device configured to receive input from a user of the system to permit the user to create an exploded view of the three-dimensional object, the exploded view displaying to the user designs of all the semi-translucent three-dimensional shapes in the three-dimensional object.

With reference to the first aspect, in a fifth possible implementation of the first aspect, in response to the display control unit changing the design of the semi-translucent three-dimensional shapes to the second design, each computer network associated with each semi-translucent three-dimensional shape having a second design is configured to transmit a command to an intermediate upstream gateway associated with each computer network, the command instructing the gateway to disrupt data from an Internet Protocol address that triggered transmission of an event notification from each computer network to the computing device.

With reference to the first aspect, in a sixth possible implementation of the first aspect, the display control unit is further configured to sort semi-translucent three-dimensional shapes in the three-dimensional object into clusters according to the type of event notification transmitted by each of the associated computer networks, wherein a form of the three-dimensional object is maintained during the sorting of the semi-translucent three-dimensional shapes.

With reference to the first aspect, in a seventh possible implementation of the first aspect, the display control unit displays the three-dimensional object by projecting the image of the three-dimensional object onto a surface.

With reference to the first aspect, in an eighth possible implementation of the first aspect, the display control unit causes semi-translucent three-dimensional shapes having the second design to rotate about a plurality of axes in response to the computing device receiving event notifications from computer networks associated with the semi-translucent three-dimensional shapes having the second design.

With reference to the first aspect, in a ninth possible implementation of the first aspect, the event notifications each comprises: a type of information security threat; an Internet Protocol address of a source that triggered transmission of the event notification from the computer network to the computing device; and an Internet Protocol address of an intermediate upstream gateway of the computer network that transmitted the event notification.

With reference to the first aspect, in a tenth possible implementation of the first aspect, the system further comprises the display control unit being configured to reduce geometries of the semi-translucent three-dimensional shapes in the three-dimensional object in response to the computing device receiving a request to add new semi-translucent three-dimensional shapes to the three-dimensional object.

With reference to the first aspect, in an eleventh possible implementation of the first aspect, the second design further comprises rotating the semi-translucent three-dimensional shape about a plurality of axes of the semi-translucent three-dimensional shape.

BRIEF DESCRIPTION OF THE DRAWINGS

The above and other problems are solved by features and advantages of a system and method in accordance with the present invention described in the detailed description and shown in the following drawings.

DETAILED DESCRIPTION

This invention relates to a system and method for simultaneously displaying real-time information security statuses of a large number of computer networks that are under surveillance. In particular, the invention involves displaying a three-dimensional abstract object that has been sized according to the size and orientation of a display screen so that the entirety of the three-dimensional abstract object may be simultaneously viewed by a viewer of the display screen. The displayed three-dimensional abstract object is formed from an amalgamation of semi-translucent three-dimensional shapes that are arranged together to achieve the unified shape and form of the three-dimensional abstract object. Each semi-translucent three-dimensional shape in the three-dimensional abstract object represents a computer network under surveillance for information security threats and/or has a high probability of being subjected to cyber security attacks or threats. As the status of the computer network associated with the semi-translucent three-dimensional shape changes, a design associated with the affected three-dimensional shape changes as well thereby providing an instant stimulus to a user of the system. A status of a computer network changes when an event manager of the computer network transmits an event notification to a computing device of the invention.

Figure 1:
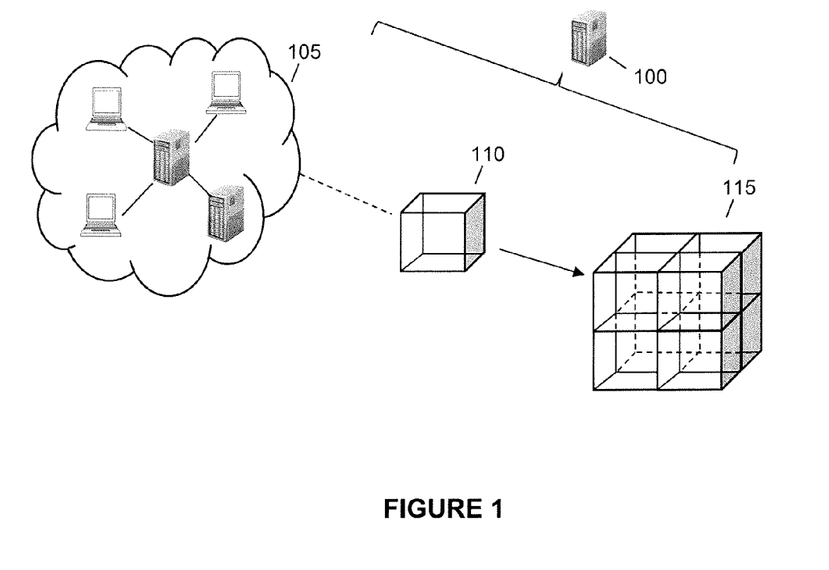
FIG. 1 illustrating a network diagram of a system for generating a three-dimensional shape for each computer network under surveillance and for arranging the generated three-dimensional shapes into a three-dimensional object in accordance with embodiments of the invention.

FIG. 1 illustrates a network diagram of a system in accordance with embodiments of the invention whereby the system includes computer network 105 and central monitoring system 100 for generating and displaying semi-translucent three-dimensional shape 110 that shows the information security status of computer network 105. Monitoring system 105 also displays the information security statuses of other computer networks under surveillance simultaneously through three-dimensional abstract object 115. Computer network 105 comprises a plurality of computers, servers, event managers, gateways, firewalls, routers, and various other types of computing and/or network devices and is discussed in greater detail below with reference to FIG. 2. Central monitoring system 100, which comprises of various computing devices, display control units, control logic units, input devices, etc., is utilized to monitor an information security status of computer network 105. Computer network 105 may be communicatively connected to monitoring system 100 via wireless or wired means or a combination of both. In addition to monitoring the information security status of computer network 105, one skilled in the art will recognize that monitoring system 100 may be configured to monitor information security statuses of a large number of other computer networks.

Monitoring system 100 will generate a semi-translucent three-dimensional shape for each computer network that is under surveillance of monitoring system 100. This may be done using a computing device provided within monitoring system 100. As illustrated in FIG. 1, as computer network 105 is shown as being under surveillance of monitoring system 100, monitoring system 100 will generate semi-translucent three-dimensional shape 110 having a first design for computer network 105. In other words, three-dimensional shape 110 is used by monitoring system 100 as a representation of an information security status of computer network 105 whereby the design of three-dimensional shape 110 will change according to a change in the information security status of computer network 105. The change in the design of the semi-translucent three-dimensional shape will be initiated by monitoring system 100 upon receipt of an event notification from computer network 105. If computer network 105 is operating normally, three-dimensional shape 110 will be shown as having a first design or its original design, i.e. the design which was originally generated for the three-dimensional shape. Conversely, if computer network 105 is under cyber-attack or subjected to an information security threat, monitoring system 100 will be notified by computer network 105 accordingly and monitoring system 100 will update the information security status of computer network 105. When this happens, monitoring system 100 will cause three-dimensional shape 110 to change its design to another design. This change in the design of three-dimensional shape 110 takes place so that a viewer of the system will be notified that computer network 105, which is represented by three-dimensional shape 110, is presently under information security attack or is subject to a computer security threat. Once the information security threat or attack has been addressed, monitoring system 100 will be notified accordingly by computer network 105 and monitoring system 100 will then cause the design of three-dimensional shape 110 to return to the first design or its original design.

In embodiments of the invention, monitoring system 100 will generate semi-translucent three-dimensional shapes for each computer network under its care. This means that if monitoring system 100 is monitoring the information security status of eight different computer networks, eight individual semi-translucent three-dimensional shapes will be generated by monitoring system 100 whereby each three-dimensional shape will be associated with the information security status of each computer network under surveillance. One skilled in the art will understand that a three-dimensional shape may refer to a three-dimensional polyhedron, a three-dimensional sphere, a cuboid or any other such three-dimensional designs. In embodiments of the invention, the three-dimensional shape is illustrated as a three-dimensional cuboid. FIG. 1 illustrates the embodiment whereby monitoring system 100 is monitoring the information security status of four different computer networks as such; four corresponding semi-translucent three-dimensional shapes have been generated by monitoring system 100.

After a semi-translucent three-dimensional shape has been generated for each computer network under surveillance, monitoring system 100 will then arrange these three-dimensional shapes into a single three-dimensional object which has the same shape and form as those individual semi-translucent three-dimensional shapes. As semi-translucent three-dimensional shape 110 illustrated in FIG. 1 is shaped as a cuboid, monitoring system 100 then proceeds to arrange these three-dimensional cuboid shapes into single three-dimensional abstract object 115 that has the overall shape and form of a cuboid, i.e. a Rubik cube. It is necessary for each generated three-dimensional shape to be semi-translucent or semi-transparent due to the large number of three-dimensional shapes that will be generated by monitoring system 100. If the three-dimensional shapes were generated as solid shapes, after the solid shapes are arranged into a single three-dimensional object, changes in the design of solid shape at the rear or middle of the three-dimensional object would not be noticed by a viewer of the system as this solid shape at the rear or middle would be blocked by a solid shape positioned in front of it. As such, the invention requires for the three-dimensional shapes to be generated as semi-translucent or semi-transparent shapes. This is so that changes in the design of a three-dimensional shape at the rear or middle of the three-dimensional abstract object (e.g. three-dimensional object 115) would be easily noticed by a viewer of the system.

After monitoring system 100 has arranged the individual semi-translucent three-dimensional shapes into a single three-dimensional object which has the same shape and form as those individual semi-translucent three-dimensional shapes, the three-dimensional object will be displayed on a display screen to be viewed by a user of the system. Prior to displaying the three-dimensional object, a display control unit provided within monitoring system 100 would obtain parameters of a display screen on which the three-dimensional object is to be displayed. These parameters may include, but are not limited to, the size and/or orientation of the screen, the type of the screen, and any other relevant details. The obtained parameters are then utilized by monitoring system 100 to size the three-dimensional object accordingly so that the entirety of the three-dimensional object may be simultaneously displayed by the display control unit on the display screen. In embodiments of the invention, the display screen may be a computer display screen, a liquid crystal display, a projector screen or a flat surface on a wall or any similar type of surface onto which the display may be projected onto.

Figure 2:
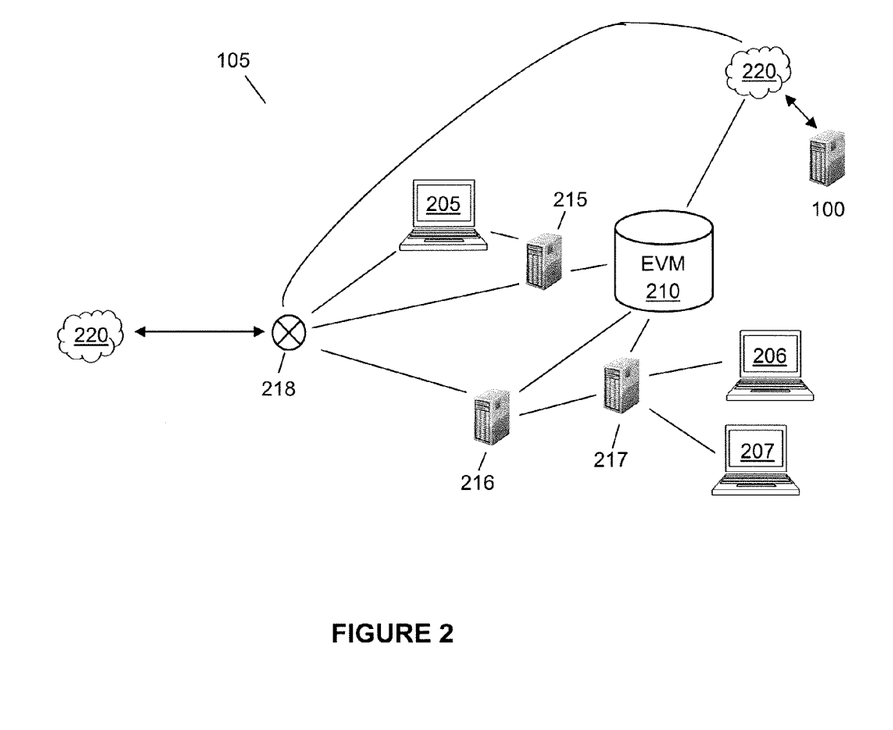
FIG. 2 illustrating a network diagram of a computer network having an Event Manager and an intermediate upstream gateway in accordance with embodiments of the invention.

FIG. 2 illustrates computing and network devices that may be included within computer network 105. Computer network 105 may include computer assets such as computing devices 205, 206 and 207. These computing devices may include any type of computing device and may comprise, but are not limited to, smart phones, laptops, tablets, computers, servers, workstations, and so on. As illustrated in FIG. 2, computing devices 205, 206 and 207 all connect to network 220 via intermediate upstream gateway 218. Computing devices 205, 206 and 207 communicatively connect to intermediate upstream gateway 218 either via wired means, wireless means or a combination of both. Wired means may include a wired network such as a wide area network (WAN) or a local area network (LAN), while wireless means includes connections established via Radio Frequency (RF) signals, infrared signals, or any other means of wireless transmissions.

Intermediate upstream gateway 218 is a node of network 105 which serves as an access/exit point from network 220 to network 105. Intermediate upstream gateway 218 may include any network node that is able to route internet traffic from any number of computing devices located behind the gateway to computing devices located on external networks. Such network nodes include, but are not limited to, devices that utilize border gateway protocols, DSL routers, cable routers, VLAN, bridges, switches, etc. As for network 220, network 220 is a communications network, such as the Internet, that allows computing devices and/or processing systems on one computer network to communicate with one device on other computer networks either through wired means, wireless means or a combination of both.

Computer network 105 also includes monitoring devices 215, 216, 217 and these monitoring devices are network security devices that monitor a computer network's activities for malicious activities and may subsequently transmit an alert when such activity has been detected. Furthermore, when logging information about the detected malicious activity, these monitoring devices are also able to resolve, log and transmit the IP address of the source that is initiating the attack together with the IP address and identity of the network's gateway via which the attack passed through to access computing devices within network 105. Such network security devices may include, but are not limited to, hardware or software firewalls, antivirus software programs installed within computer modules, intrusion detection systems and/or intrusion prevention systems.

Monitoring devices 215, 216 and 217 are all communicatively connected to event manager 210 (EVM) either via wired means, wireless means or a combination of both. Event manager 210 includes various computer modules for carrying out various functions such as, but not limited to, a computing module for receiving and processing alerts from monitoring devices, a computing module for storing received alerts in a database provided within event manager 210, a computing module for communicating with a gateway via an out-of-band network, and a transceiver module for receiving/transmitting data from/to the Internet. In addition to the above, event manager 210 may also include a computing module for determining the IP address or identity of the intermediate upstream gateway through which an information security network attack entered network 105. An appropriate instruction set will then be used to compile instructions that are to be sent to the gateway to disrupt data transmissions from a malicious source.

Event manager 210 also includes a computing module for transmitting an event notification to a monitoring system, e.g. monitoring system 100. This event notification may be transmitted through network 220 or through other wired or wireless telecommunication networks. Such an event notification will be transmitted once event manager 210 determines (from alerts received from monitoring devices) that computer network 105 is under cyber-attack or threat. Monitoring system 100 upon receiving such an event notification will update its internal databases to show that the information security status of computer network 105 has changed from "normal" to "under attack". When this happens, semi-translucent three-dimensional shape 110 that is associated with computer network 105 will change from a first design to a second design. This change in the design of the three-dimensional shape informs a viewer of the system that computer network 105 is under cyber-attack and as such, requires further attention.

Event manager 210 may be communicatively connected to gateway 218 via a telecommunications network or via an out-of-band network. If data is to be transmitted from event manager 210 to intermediate upstream gateway 218 via a telecommunications network, event manager 210 will first transmit this data to network 220 either via wired means, wireless means or a combination of both. The data will then be transmitted from network 220 to intermediate upstream gateway 218 via a telecommunication interface on gateway 218. Telecommunication networks that may be utilized to transmit data between event manager 210 and intermediate upstream gateway 218 may include, but are not limited to, a TCP/IP data network or an optical transport network. In the event the telecommunication interface of intermediate upstream gateway 218 is disrupted or blocked, an out-of-band network may be utilized to transmit data from event manager 210 to intermediate upstream gateway 218. When an out-of-band network is utilized, data will initially be transmitted from event manager 210 to gateway 218 via internet 220 using Secure Shell (SSH), Secure Sockets Layer (SSL), Telnet and RS-232 protocols. The data will then be transmitted from network 220 to an out-of-band interface provided at gateway 218. The out-of-band interface is usually built into gateway 218 and may be used to receive instructions to configure an access control list of gateway 218. In accordance with an embodiment of the invention, the out-of-band interface at gateway 218 may comprise standard RS-232 serial ports that may be used to receive instructions to modify administrative and reporting functions, such as the gateway's access control list.

Figure 3:
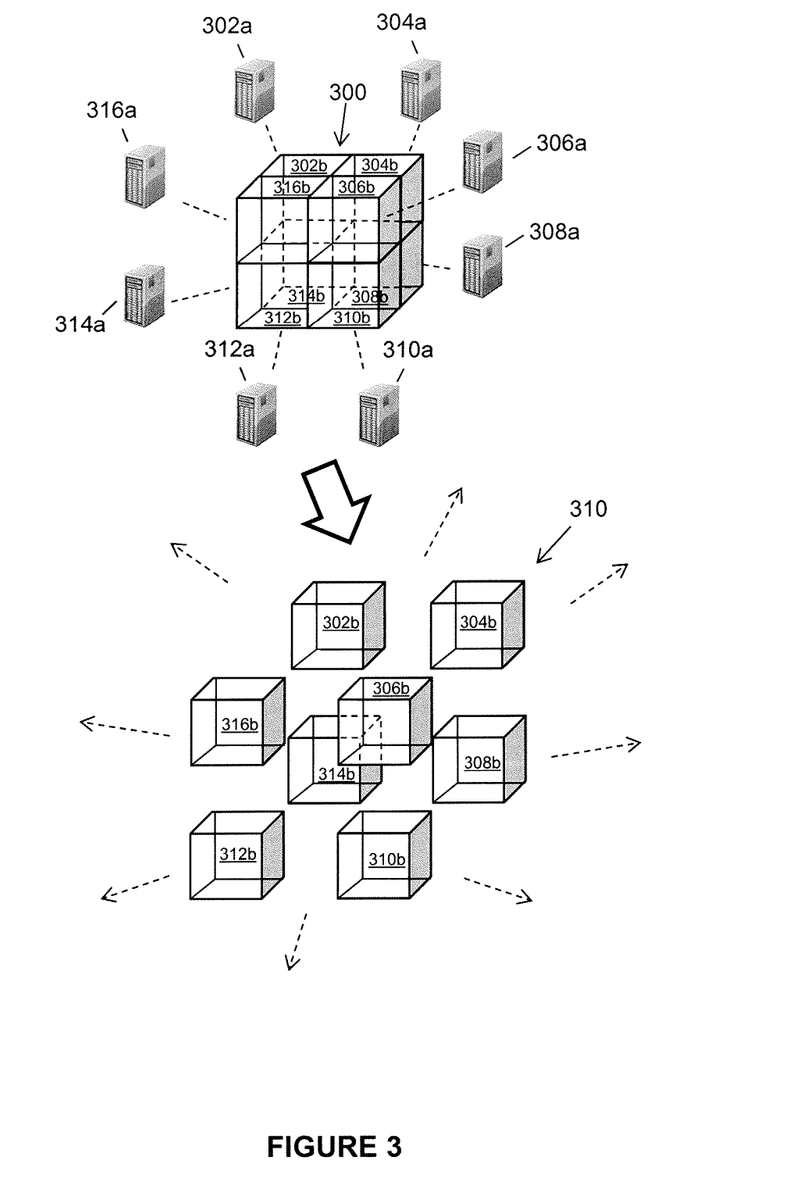
FIG. 3 illustrating a three-dimensional object formed from semi-translucent three-dimensional shapes and their respective computer networks in accordance with embodiments of the invention.

FIG. 3 illustrates computer networks 302*a*-316*a* together with their respective semi-translucent three-dimensional shapes 302*b*-316*b* respectively. Three-dimensional shapes 302*b*-316*b* have been combined and arranged as three-dimensional object 300. In embodiments of the invention, in response to receiving an input or an external signal, monitoring system 100 may be configured to cause individual semi-translucent three-dimensional shapes 302*a*-316*a* within three-dimensional object 300 to come apart. Such an exploded view of three-dimensional object 300 is illustrated as exploded three-dimensional object 310 in FIG. 3. In the exploded view, the user would be able to obtain a clearer view of the designs of the semi-translucent three-dimensional shapes that are located at the rear of the three-dimensional object, e.g. shapes 308*b* and 314*b*.

As illustrated in FIG. 3, each individual three-dimensional shape is associated with an individual computer network and the design of each of these three-dimensional shapes represents the current information security status of the computer network associated with the three-dimensional shape. When the information security status of the computer network changes, i.e. when the event manager of the affected computer network transmits an event notification to the monitoring system, the design of a semi-translucent three-dimensional shape associated with the affected computer network will change to a different design.

Figure 4:
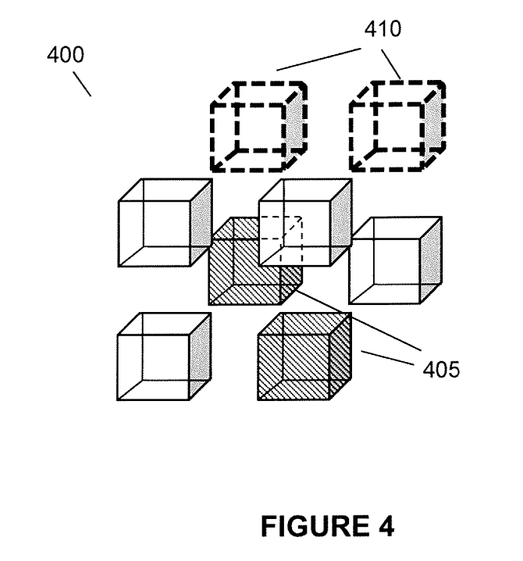
FIG. 4 illustrating a three-dimensional object formed from semi-translucent three-dimensional shapes whereby two three-dimensional shapes are illustrated as having a second design in accordance with embodiments of the invention.

The change in the design of a semi-translucent three-dimensional shape may involve, but is not limited to, a change in the outline of the three-dimensional shape, a change in the colour of the three-dimensional shape, a change in the fill pattern of the three-dimensional shape or a change in the colour tone of the outline of the three-dimensional shape. A three-dimensional object 400 which illustrates some embodiments of these changes is illustrated in FIG. 4. Shapes 410 illustrate the change in the outline of the three-dimensional shapes while the change in the fill patterns of the three-dimensional shapes are shown as shapes 405 in FIG. 4.

Figure 5:
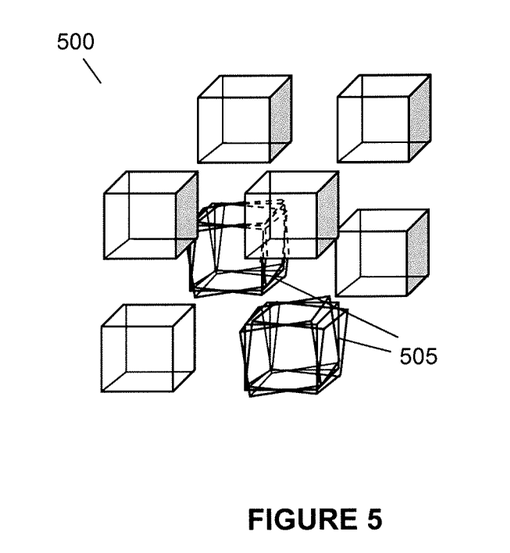
FIG. 5 illustrating a three-dimensional object formed from semi-translucent three-dimensional shapes whereby two three-dimensional shapes are illustrated as rotating about their axes in accordance with embodiments of the invention.

In another embodiment of the invention, in order to indicate a change in the information security status of an associated computer network, a semi-translucent three-dimensional shape may be made to "wiggle" or rotate about its axes. This embodiment is illustrated in FIG. 5 whereby three-dimensional object 500 is illustrated as having two semi-translucent three-dimensional shapes 505 that are rotating about a plurality of their respective axes.

Figure 6:
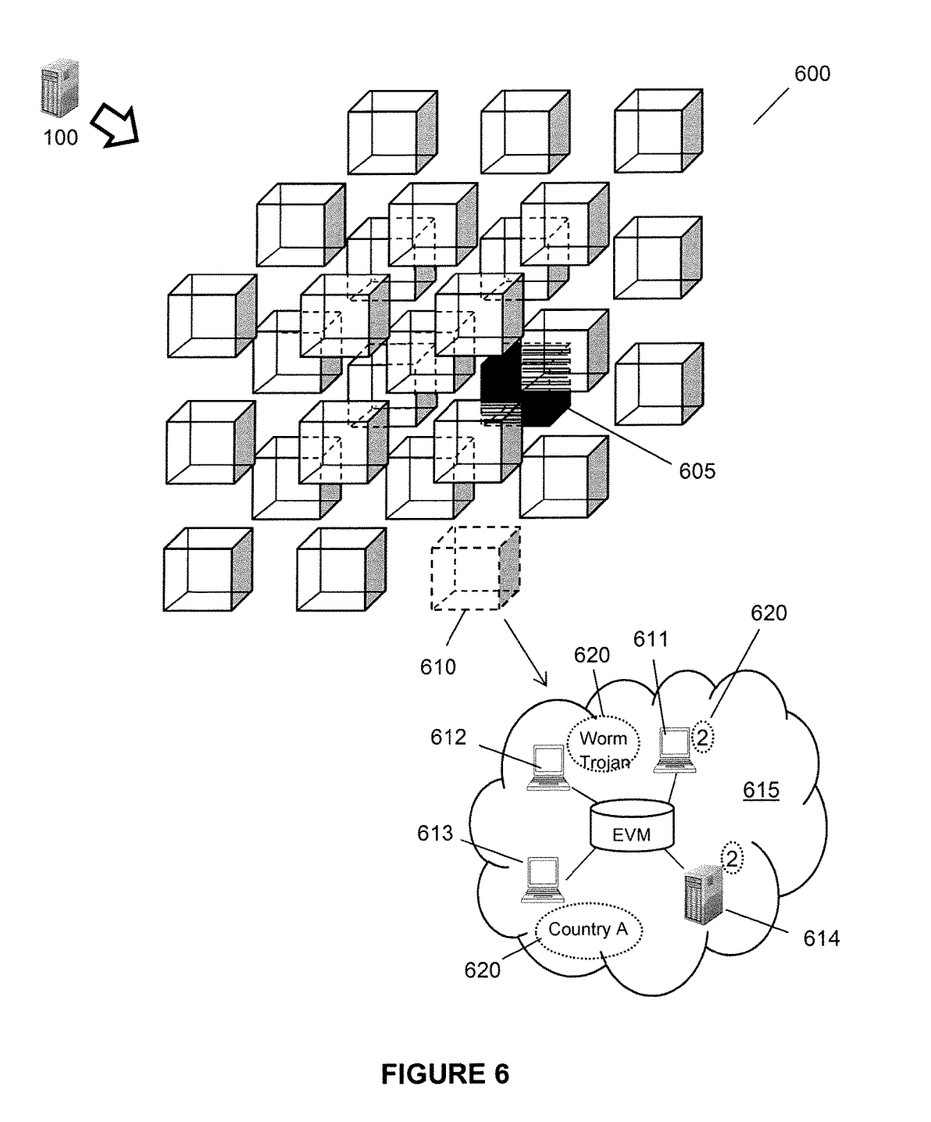
FIG. 6 illustrating a three-dimensional object formed from semi-translucent three-dimensional shapes that each represents a computer network under surveillance in accordance with embodiments of the invention.

One skilled in the art will recognize that the monitoring system may be utilized to generate a large number of semi-translucent three-dimensional shapes that are linked to the information security statuses of their respective computer networks. These three-dimensional shapes may then subsequently be amalgamated to produce a single three-dimensional object. The sizes of each of these individual semi-translucent three-dimensional shapes depend on the parameters obtained from the display screen. If there are a large number of semi-translucent three-dimensional shapes that make up the three-dimensional object, this means that the sizes of each of these individual three-dimensional shapes will have to be reduced. However, due to the unique arrangement of these three-dimensional shapes in the three-dimensional object, the readability and legibility of these individual three-dimensional shapes are not sacrificed even when the geometrical sizes of these individual three-dimensional shapes are reduced. This is illustrated in FIG. 6 which shows three-dimensional object 600 that is made up of a total of twenty seven semi-translucent three-dimensional shapes. When the information security status of a computer network associated with semi-translucent three-dimensional shape 605 (that is positioned at the rear of three-dimensional object 600) changes, this change in the design is easily noticed by a viewer utilizing monitoring system 100.

In an embodiment of the invention, monitoring system 100 may be provided with an input device configured to receive input signals from a user of monitoring system 100. This input device may comprise, but is not limited to, a tactile input device that is able to detect a user's hand movements or a computing input/out device such as a mouse, a keyboard, a track-pad, a trackball or any other such devices. The provided input device may be configured to allow the user of a system to select one or more semi-translucent three-dimensional shapes from the displayed three-dimensional object. When a semi-translucent three-dimensional shape is selected, monitoring system 100 will cause an associated computer network's computing devices to be displayed to the user. The computing devices that will be displayed may include computing devices that are under information security attacks, or may include all the computing devices that are contained within the computer network. In a preferred embodiment of the invention, only computing devices that are under information security attack are displayed.

Such an embodiment is illustrated in FIG. 6 whereby semi-translucent three-dimensional shape 610 having a second design is assumed to be selected by a user of monitoring system 100 using an input device provided within monitoring system 100. When this happens, monitoring system 100 will determine from the event notification (sent from the computer network associated with three-dimensional shape 610) the identities of the computing devices in the affected computer network that are experiencing information security attacks. Once monitoring system 100 has ascertained the identifies of these computing devices, monitoring system 100 will then cause affected computing devices 611-614 to be displayed. Computing devices 611-614 may be displayed in a separate window such as window 615 or may be displayed adjacent three-dimensional object 600. A small status window, status 620 is positioned next to each of computing devices 611, 612, 613 and 614. Status 620 may be configured to display, but is not limited to, the number of unique information security attacks that are affecting a particular computing device, the number of attacks affecting a computing device for a particular jurisdiction, a list of the different types of computer security attacks that are threating the computing device and so on. For example, status 620 adjacent computing device 611 shows a number "2". This means that computing device 611 is presently experiencing two unique information security attacks.

In yet another embodiment of the invention, the input device may be configured to receive input from a user of the system to permit the user to cause the display control unit to rotate the three-dimensional object about a plurality of axes or to alter the geometry of the three-dimensional object. This allows the user to obtain a clearer view of semi-translucent three-dimensional shapes positioned at the rear and sides of the three-dimensional object. The input device may also be configured to receive an input from a user of the system to permit the user to create an exploded view of the three-dimensional object. In the exploded view, the user would be able to obtain a clearer view of the designs of the semi-translucent three-dimensional shapes that are located in the middle of the three-dimensional object.

In another embodiment of the invention, when the event manager of an affected computer network transmits an event notification to the monitoring system, the event manager may be configured to simultaneously transmit a command to an intermediate upstream gateway of the affected computer network, i.e. the computer network associated with the selected semi-translucent three-dimensional shape. This command will instruct the intermediate upstream gateway of the computer network to disrupt data from an Internet Protocol address that caused the affected computer network to transmit an event notification to the monitoring system. The disruption of data may be initiated by adding the Internet Protocol address of the alleged malicious source to the access control list of the gateway thereby preventing the further transmission of data to the affected computer network from the malicious source. This means that as the monitoring system is changing a design of a semi-translucent three-dimensional shape associated with the affected computer network, the event manager of the affected computer network would be simultaneously disrupting the transmission of data from the malicious source.

In embodiments of the invention, monitoring system 100 is provided with a control logic unit which is configured to assign weightages to each of the semi-translucent three-dimensional shapes in the three-dimensional object. When the semi-translucent three-dimensional shapes are being arranged to form the three-dimensional object, the semi-translucent three-dimensional shapes will be arranged according to their assigned weightages whereby semi-translucent three-dimensional shapes with higher weightages will be positioned at more prominent positions, i.e. near the front, while semi-translucent three-dimensional shapes with lesser weightages will be positioned at less prominent positions, i.e. at the rear.

In other embodiments of the invention, the display control unit within monitoring system 100 may be configured to cluster the semi-translucent three-dimensional shapes in the three-dimensional object according to the type of event notification generated by each respective computer network. For example, if a first group of computer networks transmit event notifications that indicate that the source of their attacks is from Country A while a second group of computer networks transmit event notifications that indicate that the source of their attacks is from Country B, the display control unit may be triggered by a user to rearrange the individual semi-translucent three-dimensional shapes within the three-dimensional object so that these shapes are clustered according to the source of the attacks as indicated in the received event notifications.

In embodiments of the invention, a process is needed for generating a three-dimensional object made up of individual semi-translucent three-dimensional shapes whereby each shape represents the information security status of a computer network under surveillance. The following description and FIG. 7 describes an embodiment of a process in accordance with this invention.

Figure 7:
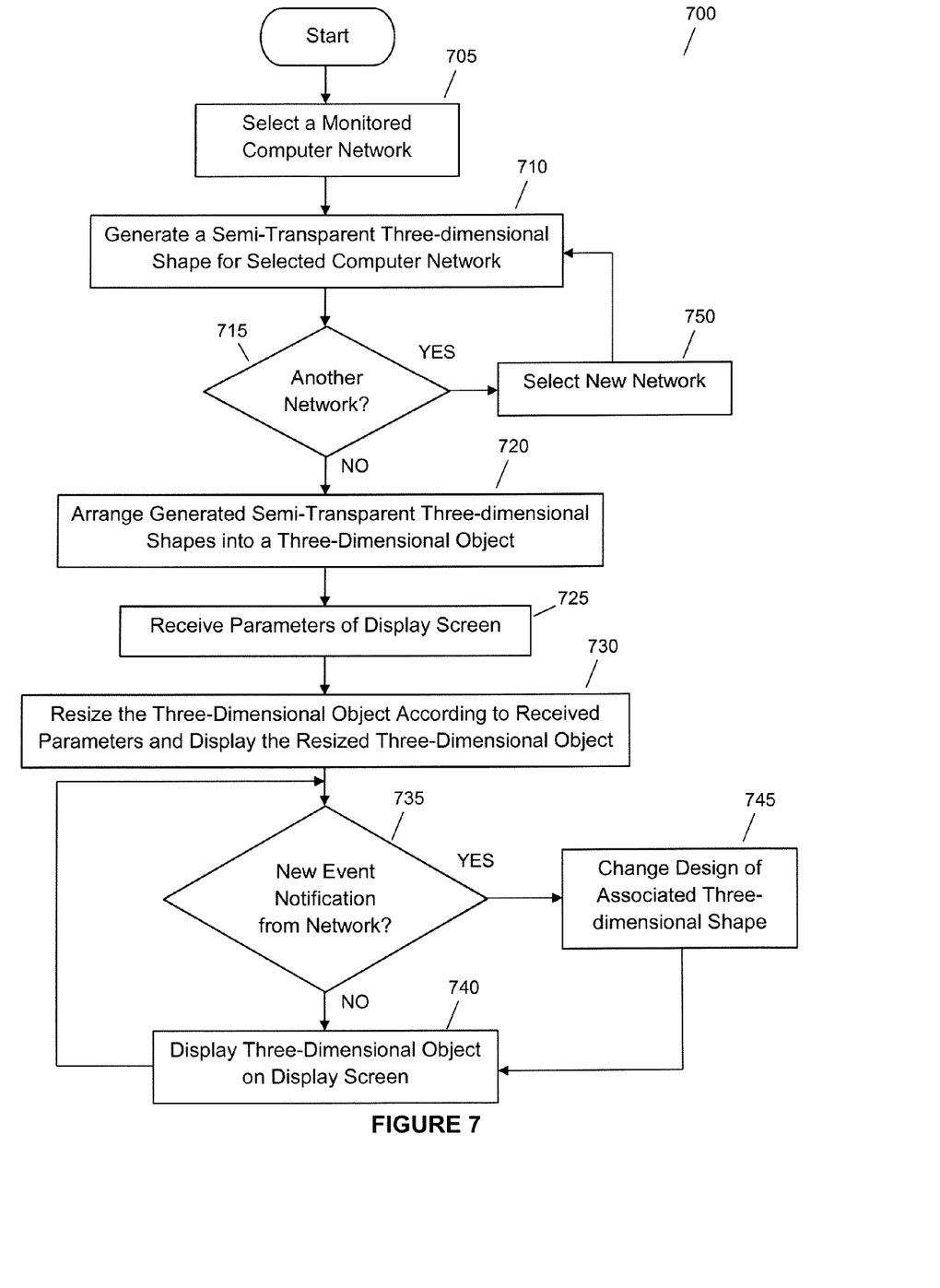
FIG. 7 illustrating a flow diagram of a process for generating a three-dimensional object formed from semi-translucent three-dimensional shapes whereby each three-dimensional shape represents a computer network under surveillance in accordance with embodiments of the invention.

FIG. 7 illustrates process 700 that is performed by a computer system to generate individual semi-translucent three-dimensional shapes whereby each shape represents an information security status of a computer network under surveillance. The process then combines these individual shapes to form a three-dimensional object whereby the designs of these individual shapes will change, as the information security status of their corresponding computer networks change accordingly.

Process 700 begins at step 705 whereby process 700 selects a computer network that is under surveillance of the system. Process 700 then generates a semi-translucent three-dimensional shape for the selected computer network. The generated semi-translucent three-dimensional shape will be generated with a first design, or an original design. Process 700 then proceeds to step 715. At step 715, process 700 will determine whether there is another computer network in its records that is not represented by an associated semi-translucent three-dimensional shape. If process 700 determines that there is another computer network that is not represented by a semi-translucent three-dimensional shape, process 700 proceeds to step 750. At step 750, the unrepresented computer network is selected and process 700 proceeds to generate a semi-translucent three-dimensional shape for this unrepresented computer network at step 710. Steps 710-750 repeats until all the computer networks under the monitoring system's care are represented by semi-translucent three-dimensional shapes. When process 700 determines at step 715 that all computer networks under surveillance are represented by their respective semi-translucent three-dimensional shapes, process 700 then proceeds to step 720. At step 720, process 700 arranges all the individually generated semi-translucent three-dimensional shapes into a single three-dimensional object. Process 700 then receives at step 725 the parameters of a display screen onto which the three-dimensional object is to be displayed on. At step 730, based on the received parameters, process 700 will cause the three-dimensional object to be resized accordingly so that the entirety of the three-dimensional object may be displayed on the display screen. The resized three-dimensional object is then subsequently displayed.

At step 735, process 700 will perform a check to determine whether any new event notifications have been generated by computer networks under surveillance under its care. If process 700 determines that an event notification has been received from a computer network under its surveillance, process 700 will proceed to step 745 whereby process 700 will change the design of the semi-translucent three-dimensional shape that represents the computer network under its surveillance that transmitted the event notification to second design. Process 700 then proceeds to display the three-dimensional object on the display screen at step 740 whereby the semi-translucent three-dimensional shape with the second design is also displayed. Process 735-740 continuously repeats itself whereby designs of semi-translucent three-dimensional shapes in the three-dimensional object are dependent on the information security status of the respective computer networks under surveillance.

Figure 8:
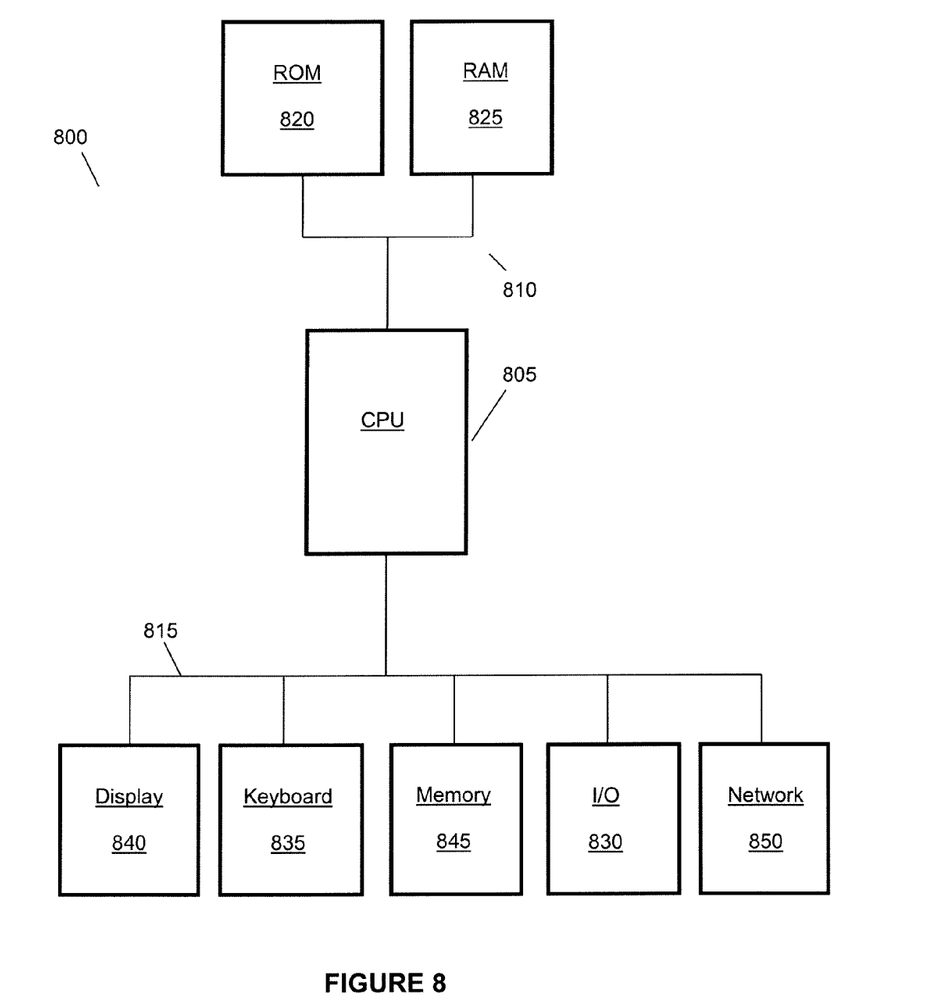
FIG. 8 illustrating a block diagram representative of processing systems providing embodiments in accordance with embodiments of the invention.

Processes described above may be provided by instructions stored in a non-transitory computer-readable media and are executed by a processing unit in a computer system. For the avoidance of doubt, non-transitory computer-readable media shall be taken to comprise all computer-readable media except for a transitory, propagating signal. A computer system may be provided in one or more mobile devices and/or computer servers to provide this invention. The instructions may be stored as firmware, hardware, or software. FIG. 8 illustrates an example of such a processing system. Processing system 800 may be the processing system in the monitoring system that execute the instructions to perform the processes for providing a method and/or system in accordance with embodiments of this invention. One skilled in the art will recognize that the exact configuration of each processing system may be different and the exact configuration of the processing system in each mobile device may vary and FIG. 8 is given by way of example only.

Processing system 800 includes Central Processing Unit (CPU) 805. CPU 805 is a processor, microprocessor, or any combination of processors and microprocessors that execute instructions to perform the processes in accordance with the present invention. CPU 805 connects to memory bus 810 and Input/Output (I/O) bus 815. Memory bus 810 connects CPU 805 to memories 820 and 825 to transmit data and instructions between memories 820, 825 and CPU 805. I/O bus 815 connects CPU 805 to peripheral devices to transmit data between CPU 805 and the peripheral devices. One skilled in the art will recognize that I/O bus 815 and memory bus 810 may be combined into one bus or subdivided into many other busses and the exact configuration is left to those skilled in the art.

A non-volatile memory 820, such as a Read Only Memory (ROM), is connected to memory bus 810. Non-volatile memory 820 stores instructions and data needed to operate various sub-systems of processing system 800 and to boot the system at start-up. One skilled in the art will recognize that any number of types of memory may be used to perform this function.

A volatile memory 825, such as Random Access Memory (RAM), is also connected to memory bus 810. Volatile memory 825 stores the instructions and data needed by CPU 805 to perform software instructions for processes such as the processes required for providing a system in accordance with embodiments of this invention. One skilled in the art will recognize that any number of types of memory may be used as volatile memory and the exact type used is left as a design choice to those skilled in the art.

I/O device 830, keyboard 835, display 840, memory 845, network device 850 and any number of other peripheral devices connect to I/O bus 815 to exchange data with CPU 805 for use in applications being executed by CPU 805. I/O device 830 is any device that transmits and/or receives data from CPU 805. Keyboard 835 is a specific type of I/O that receives user input and transmits the input to CPU 805. Display 840 receives display data from CPU 805 and display images on a screen for a user to see. Memory 845 is a device that transmits and receives data to and from CPU 805 for storing data to a media. Network device 850 connects CPU 805 to a network for transmission of data to and from other processing systems.

The above is a description of embodiments of a system and process in accordance with the present invention as set forth in the following claims. It is envisioned that others may and will design alternatives that fall within the scope of the following claims.

The invention claimed is:

1. A system for simultaneously displaying real-time information security statuses of a plurality of computer networks under surveillance to obtain situational awareness of the plurality of computer networks, the system comprising:
   at least one processor provided in a computing device;
   memory readable by the at least one processor; and
   instructions that when read by the at least one processor directs the at least one processor to perform operations including:
      generate a plurality of semi-translucent three-dimensional shapes with each shape having a first design, whereby each of the plurality of semi-translucent three-dimensional shapes is associated with one of the plurality of computer networks under surveillance, arrange all the semi-translucent three-dimensional shapes into a single three-dimensional object, wherein the three-dimensional object has a similar shape and form as each of the semi-translucent three-dimensional shapes, and
   maintain a display control unit operable with the computing device whereby the display control unit directs the at least one processor to:
      receive parameters of a display screen size and orientation of the display screen,
      size the three-dimensional object according to the received parameters to simultaneously display an entirety of the three-dimensional object, and
      change the design of semi-translucent three-dimensional shapes in the three-dimensional object to a second design in response to the computing device receiving event notifications from computer networks associated with the semi-translucent three-dimensional shapes; and
   maintain a control logic unit operable with the computing device whereby the control logic unit directs the at least one processor to assign a weightage to each semi-translucent three-dimensional shape in the three-dimensional object, wherein positions of the semi-translucent three-dimensional shapes in the three-dimensional object are determined by the weightages assigned to each semi-translucent three-dimensional shape, whereby semi-translucent three-dimensional shapes with higher weightages are positioned at more visually prominent positions.

2. The system according to claim 1 wherein the instructions to maintain the display control unit further comprises instructions to further direct the at least one processor to sort semi-translucent three-dimensional shapes in the three-dimensional object into clusters according to the type of event notification transmitted by each of the associated computer networks, wherein an original form of the three-dimensional object is maintained during the sorting of the semi-translucent three-dimensional shapes.

3. The system according to claim 1 wherein the system further comprises instructions to further direct the at least one processor to:
receive input from a user of the system via an input device to permit the user to cause the display control unit to rotate the three-dimensional object about a plurality of axes.

4. The system according to claim 1 wherein the system further comprises instructions to further direct the at least one processor to:
receive input from a user of the system via an input device to permit the user to cause the display control unit to alter a geometry of the three-dimensional object.

5. The system according to claim 1 wherein the system further comprises instructions further direct the at least one processor to:
receive input from a user of the system via an input device to permit the user to create an exploded view of the three-dimensional object, the exploded view displaying to the user designs of all the semi-translucent three-dimensional shapes in the three-dimensional object.

6. The system according to claim 1 wherein the system further comprises instructions to direct the display control unit to further direct the at least one processor to:
direct each computer network associated with each semi-translucent three-dimensional shape having a second design to transmit a command to an intermediate upstream gateway associated with each computer network, the command instructing the gateway to disrupt data from an Internet Protocol address that triggered transmission of an event notification from each computer network to the computing device, when the design of each associated semi-translucent three-dimensional shape changes from the first design to the second design.

7. The system according to claim 1 wherein the instructions to maintain the display control unit further comprises instructions to further direct the at least one processor to display the three-dimensional object by projecting the image of the three-dimensional object onto a surface.

8. The system according to claim 1 wherein the instructions to maintain the display control unit further comprises instructions to further direct the at least one processor to cause the semi-translucent three-dimensional shapes having the second design to rotate about a plurality of axes in response to the computing device receiving event notifications from computer networks associated with the semi-translucent three-dimensional shapes having the second design.

9. The system according to claim 1 wherein the event notifications each comprises:
a type of information security threat;
an Internet Protocol address of a source that triggered transmission of the event notification from the computer network to the computing device; and
an Internet Protocol address of an intermediate upstream gateway of the computer network that transmitted the event notification.

10. The system according to claim 1, wherein the instructions to maintain the display control unit further comprises instructions to further direct the at least one processor to reduce geometries of the semi-translucent three-dimensional shapes in the three-dimensional object in response to the computing device receiving a request to add new semi-translucent three-dimensional shapes to the three-dimensional object.

11. The system according to claim 1 wherein the second design further comprises rotating the semi-translucent three-dimensional shape about a plurality of axes of the semi-transparent three-dimensional shape.

12. A method for simultaneously displaying real-time information security statuses of a plurality of computer networks under surveillance to obtain situational awareness of the plurality of computer networks, the method comprising:
generating, using a computing device, a plurality of semi-translucent three-dimensional shapes with each shape having a first design whereby each of the plurality of semi-translucent shapes is associated with one of the plurality of computer networks under surveillance;
arranging, using the computing device, all of the plurality of semi-translucent three-dimensional shapes into a single three-dimensional object, wherein the three-dimensional object has a similar shape and form as each of the semi-translucent three-dimensional shapes;
receiving, using a display control unit operable with the computing device, parameters of a display screen size and orientation of the display screen;
sizing, using the display control unit, the three-dimensional object according to the received parameters to simultaneously display an entirety of the three-dimensional object; and
changing, using the display control unit, the design of semi-translucent three-dimensional shapes in the three-dimensional object to a second design in response to the computing device receiving event notifications from computer networks associated with the semi-translucent three-dimensional shapes; and
assigning, using a control logic unit operable in the computing device, a weightage to each semi-translucent three-dimensional shape in the three-dimensional object, wherein positions of the semi-translucent three-dimensional shapes in the three-dimensional object are determined by the weightages assigned to each semi-translucent three-dimensional shape, whereby semi-translucent three-dimensional shapes with higher weightages are positioned at more visually prominent positions.

13. The method according to claim 12 further comprising:
sorting, using the computing device, the plurality of semi-translucent three-dimensional shapes in the three-dimensional object into clusters according to the type of event notification transmitted by each of the plurality of computer networks, wherein an original form of the three-dimensional object is maintained during the sorting of the plurality of semi-translucent three-dimensional shapes.

14. The method according to claim 12 further comprising:
receiving, using an input device operable with the computing device, input from a user of the system to permit the user to cause the display control unit to rotate the three-dimensional object about a plurality of axes.

15. The method according to claim 12 further comprising:
receiving, using an input device operable with the computing device, input from a user of the system to permit the user to cause the display control unit to alter a geometry of the three-dimensional object.

16. The method according to claim 12 further comprising:
receiving, using an input device operable with the computing device, input from a user of the system to permit the user to create an exploded view of the three-dimensional object, the exploded view displaying to the user designs of each of the plurality of the semi-translucent three-dimensional shapes in the three-dimensional object.

17. The method according to claim 12 further comprising: directing each computer network associated with each semi-translucent three-dimensional shape having a second design, to transmit a command to an intermediate upstream gateway associated with each computer network, the command instructing the gateway to disrupt data from an Internet Protocol address that triggered transmission of an event notification from each of the one or more one of the plurality of computer networks to the computing device when the design of each associated semi-translucent three-dimensional shape changes from the first design to the second design.

18. The method according to claim 12 wherein the displaying the three-dimensional object comprises projecting the image of the three-dimensional object onto a surface.

19. The method according to claim 12 further comprising: causing, using the display control unit, each of the plurality of semi-translucent three-dimensional shapes having the second design to rotate about a plurality of axes in response to the computing device receiving event notifications from the one of the plurality of computer networks associated with each of the plurality of semi-translucent three-dimensional shapes having the second design.

20. The method according to claim 12 wherein the event notifications each comprises:
a type of information security threat;
an Internet Protocol address of a source that triggered transmission of the event notification from the one of the plurality of computer networks to the computing device; and an Internet Protocol address of an intermediate upstream gateway of one of the plurality of computer networks that transmitted the event notification.

21. The method according to claim 12 further comprising: reducing, using the display control unit, geometries of one or more of the plurality of semi-translucent three-dimensional shapes in the three-dimensional object in response to the computing device receiving a request to add new semi-translucent three-dimensional shapes to the three-dimensional object.

22. The method according to claim 12 wherein the second design further comprises rotating the semi-translucent three-dimensional shape about a plurality of axes of the semi-transparent three-dimensional shape.

* * * * *